United States Patent [19]

Marguier

[11] Patent Number: 4,931,074

[45] Date of Patent: Jun. 5, 1990

[54] ANTICORROSION COATING COMPOSITION WITH IMPROVED STABILITY, AND COATED SUBSTRATE

[75] Inventor: Gilbert Marguier, Senlis, France

[73] Assignee: Dacral, S.A., France

[21] Appl. No.: 62,167

[22] Filed: Jun. 12, 1987

[51] Int. Cl.$^5$ .................. C23C 22/26; C23C 22/32
[52] U.S. Cl. ................................. 148/248; 148/268
[58] Field of Search .................. 148/6.2, 248, 268

[56] References Cited

U.S. PATENT DOCUMENTS

| | | | |
|---|---|---|---|
| 2,762,732 | 9/1950 | Somers | 148/6.2 |
| 3,318,716 | 5/1967 | Schuster | 148/6.2 |
| 3,718,509 | 2/1973 | Germano | 148/6.2 |
| 3,990,920 | 11/1976 | Ridder | 148/6.2 |
| 4,266,975 | 5/1981 | Toshio | 148/6.2 |
| 4,787,815 | 12/1984 | Dorsell | 148/6.2 |

*Primary Examiner*—Sam Silverberg
*Attorney, Agent, or Firm*—Dressler, Goldsmith, Shore, Sutker & Milnamow, Ltd.

[57] ABSTRACT

The invention relates to an anticorrosion coating composition for a metal substrate, comprising at least:
(a) a particulate metal,
(b) chromic acid and/or one of its derivatives,
(c) boric acid and/or one of its derivatives,
(d) a pH regulator such as zinc oxide (ZnO) or cobalt carbonate (CoCO$_3$),
(e) a high-boiling solvent of the polyol or glycol ether type,
(f) an organic cosolvent with a specified solubility parameter,
(g) a defoaming solvent of the mineral spirit or naphtha type,
(h) a system of nonionic surfactants comprising at least one water-soluble surfactant and a surfactant which is soluble in mineral spirit, and
(i) water.

It also relates to metal substrates covered with the anticorrosion coating resulting from heating after the application of the composition to the substrate.

17 Claims, 1 Drawing Sheet

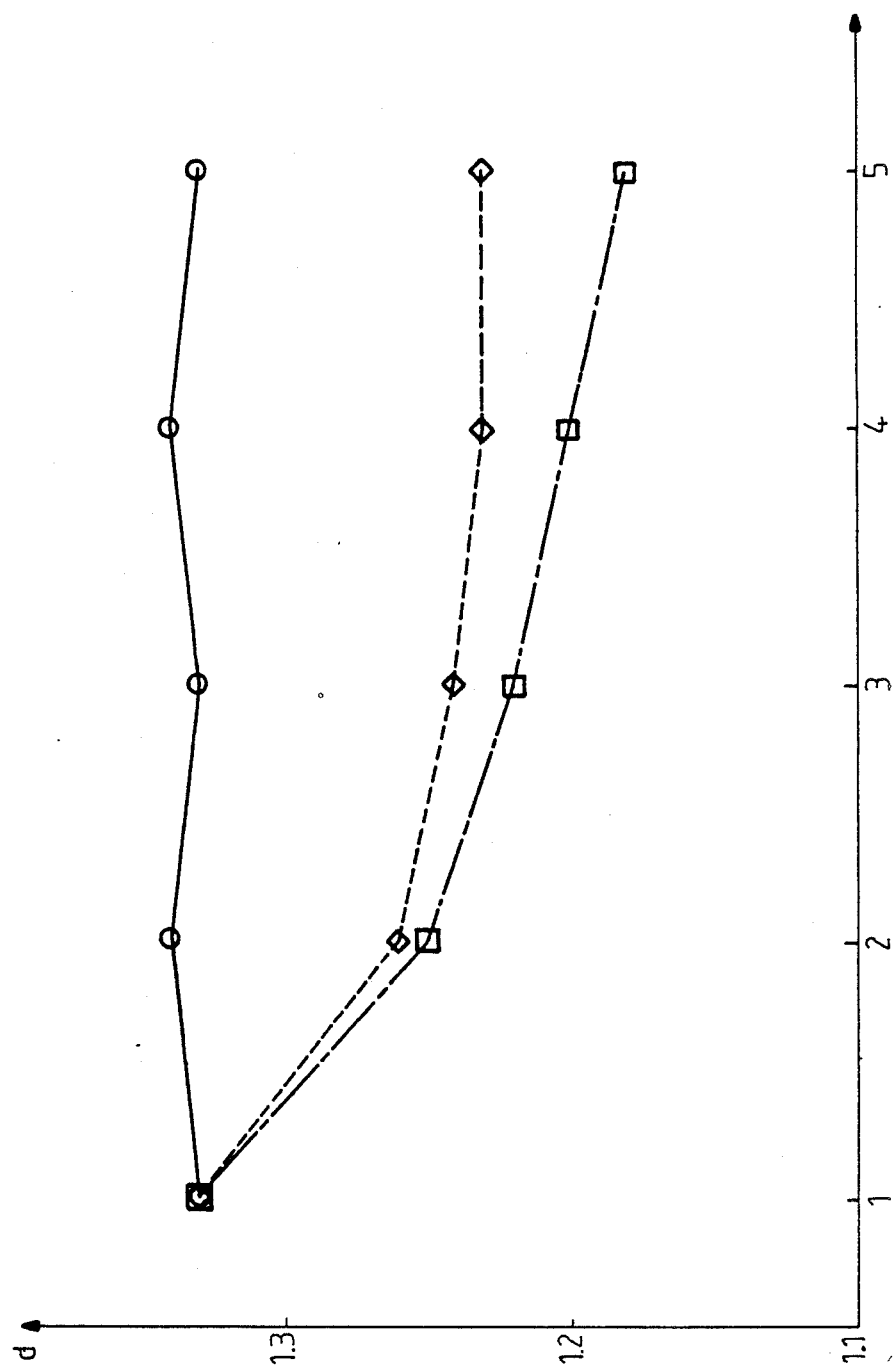

ANTICORROSION COATING COMPOSITION WITH IMPROVED STABILITY, AND COATED SUBSTRATE

The present invention relates to an anticorrosion coating composition for a metal substrate, capable of being used in particular for the protection of screwed devices and to metal substrates covered with this coating.

In the field of the fight against corrosion it is known to use compositions based on metal particles, chromic acid in solution, a glycol polymer and a wetting agent.

Thus, French Patents 2,008,770, 2,149,434 and European Patent 0,017,243, as well as French Patent Application 2,561,668, describe compositions of this kind and their improvements.

Industrial use of the compositions described in these documents has shown, however, their high sensitivity to foaming. In fact, the conditions of application of these compositions involve an entry of air during use, and this creates an air-solution emulsion, while the removal of air is prevented by the surface tension and the viscosity of these compositions.

A major disadvantage of an emulsion of this type is the retention of a certain quantity of composition in the threads of the screwed devices which are treated, and this leads to defects in the coating. This can result in considerable risks that the parts will be rejected after treatment.

The Applicant has demonstrated that the introduction of solvent from the group of heavy aliphatic or aromatic hydrocarbons into a composition of this type solves the problem of foaming (these may be, in particular, solvents of the naphtha or mineral spirit type, originating from the distillation of oils. The defoaming solvents will be referred to hereinafter by the name of "mineral spirit" although mineral spirit is only an individual example). Nevertheless, mineral spirit is not usually miscible with the compositions of the type defined above, the compositions are unstable and it is detrimental to the formation of the film of anticorrosion composition at the time of coating.

The Applicant has solved this problem of the introduction of mineral spirit into the anticorrosion compositions and has developed an anticorrosion composition in which, on the one hand, mineral spirit is dispersed and, on the other hand, the wetting and film-forming properties are maintained.

The present invention relates, therefore, to an anticorrosion coating composition for a metal substrate comprising at least:
(a) a particulate metal,
(b) chromic acid and/or one of its derivatives,
(c) boric acid and/or one of its derivatives,
(d) a pH regulator, such as zinc oxide (ZnO) or cobalt carbonate ($CoCO_3$),
(e) a high-boiling solvent of the polyol or glycol ether type,
(f) an organic cosolvent with a specified solubility parameter,
(g) a defoaming solvent of the mineral spirit or naphtha type,
(h) a system of nonionic surfactants comprising at least one water-soluble surfactant and a surfactant which is soluble in mineral spirit, and
(i) water.

The use of mineral spirit in an anticorrosion coating composition enables the utilization of the compositions according to the invention to be decisively improved when they are applied onto the metal substrate, as will become apparent in the examples, without compromising the good features of the coatings produced.

It will be possible to envisage certain alternative forms of the compositions described below by referring particularly to the abovementioned patents and patent applications. The percentages are on a weight basis, unless indicated otherwise.

According to the invention, it is possible to use any metal or alloy having a negative normal electrode potential whose absolute value is greater than that of iron. Those involved may be, in particular, zinc, aluminum, cadmium and mixtures or alloys thereof, for example with nickel, iron or cobalt. More particularly, use is made according to the invention of zinc or of aluminum or alloys thereof, in particulate or lamellar (flake) form.

A mixture of zinc and aluminum particles may also be used according to the invention.

The size of the metal particles is preferably chosen in a manner which is conventional for an anticorrosion composition of this kind.

The compositions according to the invention preferably comprise from approximately 10 to approximately 40% of particulate metal.

According to the invention, the particulate metal may be introduced equally well in the form of a paste comprising the particulate metal and a liquid component such as mineral spirit, and in the form of dry particles. In particular, pastes containing from approximately 85% to approximately 92% by weight of metal and from approximately 8% to approximately 15% by weight of mineral spirit may be used.

The mineral spirit which, as has been seen, has an "antibubbling" effect may therefore be introduced with the particulate metal or independently, this being immaterial. It accounts for approximately 0.1 to approximately 10% of the composition, preferably from approximately 0.5 to approximately 6%.

Ordinary mineral spirit may be employed, that is to say a cut originating from the distillation of oils, whose boiling point is between 80° and 200° C., and which consists of various aliphatic and aromatic hydrocarbons (containing 15% of aromatics, for example).

Other essential constituents according to the invention are chromic and boric acids, usually employed in compositions of this type, which are useful because of their anticorrosive effect and are introduced in a proportion of approximately 1 to approximately 12% of the composition.

Zinc oxide or cobalt carbonate are preferably used according to the invention as a pH regulator, useful for the stability of the composition, the pH regulator accounting for approximately 0.5 to approximately 4% of the composition.

Owing to its slow volatilization, the high-boiling solvent allows a uniform anticorrosive coating to form after the composition has been applied and when it is heated. It additionally permits the conversion of chromium(VI) to chromium(III), and other redox reactions which take place when the coating is formed.

According to the invention, a solvent of the polyol or glycol ether type, such as, for example, dipropylene glycol, may be used in particular. This high-boiling solvent accounts for approximately 7% to approximately 30% of the weight of the composition.

Besides water, mineral spirit and the high-boiling solvent, the compositions according to the invention comprise a cosolvent with a specified solubility parameter, which permits the miscibility of mineral spirit with the mixture. In order to guarantee this miscibility, the solubility parameter of the cosolvent, according to the invention, lies between that of mineral spirit and that of the high-boiling solvent. Preferably, a cosolvent having a solubility parameter of between 9 and 12, preferably 10.8±1 is chosen, according to the invention.

The quantity of cosolvent is preferably at least equal to the quantity of mineral spirit, that is to say it lies at least between approximately 0.5% and approximately 10% of the weight of the composition, and preferably between approximately 0.5 and 6%.

By way of example of a suitable cosolvent according to the invention, use may be made of ethylglycol acetate or propylene glycol methyl ether acetate (Dowanol), although other cosolvents can be envisaged, on condition that they are compatible with the solvent of the glycol ether type, the mineral spirit and the chromic acid.

The simultaneous presence of water and of mineral spirit requires the presence of a system of surfactants which enable good properties of wetting of the components and of film formation to be ensured. This system comprises, on the one hand, at least one water-soluble surfactant and, on the other hand, at least one surfactant which is soluble in mineral spirit. These are preferably nonionic surfactants.

Typically, the former, water-soluble, surfactants have an HLB value greater than 10, for example of the order of 12.5, while the latter, which are insoluble in water but soluble in the aromatic and/or aliphatic solvents have a HLB value below 10, for example of the order of 8.7.

According to the invention, the system of surfactants accounts for approximately 1% to approximately 3% by weight of the composition.

Suitable surfactants according to the invention may be chosen from the formula of the nonionics, for example alkylphenol polyethoxyethers, especially oxyethylenated nonylphenols. By way of example, it is possible to use surfactants from the Remcopal® (Gerland) range, especially Remcopal® 334 (soluble in solvents) and Remcopal® 349 (water-soluble).

Lastly, by way of an optional constituent, it is also possible to add to the composition other components, such as thickeners, which permit better application of the compositions and/or solid lubricants, which improve the mechanical properties of the coating produced.

A water-soluble, nonionic polymer, for example hydroxyethyl cellulose, may be employed as a thickener, although other, especially cellulose-based, thickeners may be envisaged, on condition that they are compatible with the presence of chromic acid.

According to the invention, approximately 0.1% to approximately 2% by weight of hydroxyethyl cellulose may be added. When other thickeners, of different molecular weight, are employed, the weight proportion indicated above varies.

PTFE or $MoS_2$ may be used as a solid lubricant, as in other aqueous anticorrosion compositions. According to the invention, the compositions may comprise up to approximately 10% of solid lubricant.

The invention relates to compositions in which all the components are mixed, as well as to compositions which are presented in the form of the various components packaged separately, and to compositions in the form of premixes of various components. In general, the various components of the compositions are mixed before being applied onto the substrate, in the form of at least two premixes, one in an aqueous medium and one in an organic medium, as will become apparent in the examples.

The compositions according to the invention are employed in the traditional processes for coating metal substrates, especially steel, cast iron and sintered steel substrates.

Coating of the substrate is performed by any appropriate process, for example by dipping or spraying with a gun, and the coated substrate is then heated to an appropriate temperature and for an appropriate time until the coating hardens on the substrate, with the heating causing, in particular, the evaporation of the solvents and the internal chemical reactions enabling the formation of the coating to take place. In addition, the heating may be preceded by a draining operation, for example by centrifuging, particularly where nuts and bolts are concerned.

The coating may be produced in several layers; the application and hardening stages are then performed a number of times until the required coating thickness is produced.

As in conventional coating processes, the substrates may be pretreated, for example by alkaline degreasing followed by rinsing and fine sandblasting.

Furthermore, the coated components may form the subject of other subsequent treatments such as lacquering, varnishing and paint applications.

The compositions containing mineral spirit according to the invention result in greater stability of the product during use, particularly use in line, by virtue of the better complete control of the wetting properties with time. In addition, they are characterized by better suitability for industrial use, because of the better matching of the surface tension, because of the stability of their relative density and the absence of foaming.

The constancy of relative density with time avoids the adjustment of centrifuging. In fact, at given centrifuging conditions, the constant relative density enables the same coating thickness to be deposited all the time.

Lastly, the distribution and the appearance of the coating which the compositions according to the invention enable to be produced on the substrates to be coated, in particular metal substrates incorporating threadings, are better, especially because of the absence of bubbles and of excessive thicknesses in the threads or on the treated articles. The mechanical performance and the corrosion resistance of the coated substrates are consequently improved and losses due to rejects are reduced.

This is why the present invention also relates to the metal substrates covered with an anticorrosion coating resulting from heating a composition according to the invention after its application onto the said substrate. These are particularly screws, bolts, nuts, clips, springs or components made of stamped steel, cast iron or sintered steel, especially components of car bodywork and of domestic electric appliances.

Other features and advantages of the present invention will become apparent from reading the examples hereinafter and in the attached figure.

EXAMPLES 1 to 4

Examples of a composition containing mineral spirit

|  | Ex. 1 | Ex. 2 | Ex. 3 | Ex. 4 |
|---|---|---|---|---|
| Zinc flakes | 20 | 20 | 30 | 17 |
| Aluminum flakes |  |  |  | 3 |
| Dipropylene glycol | 10 | 15 | 20 | 15 |
| Ethylglycol acetate | 5 | 4 | 2 | 4 |
| Mineral spirit | 5 | 3 | 2 | 3 |
| Remcopal ® 334 | 1 | 0.7 | 0.5 | 0.7 |
| Remcopal ® 349 | 1.6 | 1 | 1.5 | 1 |
| Water | 51.9 | 50.8 | 35 | 50.8 |
| Chromic acid | 3 | 3 | 4 | 3 |
| Zinc oxide | 1 | 1 | 2 | 1 |
| Boric acid | 1 | 1 | 2 | 1 |
| HEC | 0.5 | 0.5 | 1 | 0.5 |
|  | 100 | 100 | 100 | 100 |

The mineral spirit contains 15% of aromatics, distilled between 150° and 195° C. and has a flashpoint of 35° C.

EXAMPLE 5

Foaming-defoaming test

The following measurements of relative density make it possible to appreciate the influence of the presence of mineral spirit on defoaming in a bath of anticorrosion composition.

|  | initial relative density O h | O h 1 min | 2 h | 3 h | 4 h | 6 h | 8 h |
|---|---|---|---|---|---|---|---|
| A | 1.35 | 1.26 | 1.28 | 1.29 | 1.29 | 1.30 | 1.31 |
| B | 1.35 | 1.28 | 1.32 | 1.33 | 1.33 | 1.34 | 1.35 |
| C | 1.35 | 1.29 | 1.33 | 1.34 | 1.35 | 1.35 | 1.35 |
| D | 1.35 | 1.29 | 1.34 | 1.35 | 1.35 | 1.35 | 1.35 |

A - reference composition without mineral spirit without mechanical defoaming;
B - reference composition without mineral spirit; mechanical defoaming;
C - composition with zinc in paste form, 2% mineral spirit;
D - composition with zinc in powder form, 2% mineral spirit.

The foaming is produced by deliberate stirring with a beater for one minute. The presence of mineral spirit considerably affects the defoaming.

EXAMPLE 6

Relative density stability test

FIG. 1 shows measurements of the relative density d of antifoaming compositions with time (in days), at constant solids content.

The composition containing mineral spirit (O) retains a relative density which is practically constant for four days. The relative density of the other two compositions (□, ◇ standard Dacromet ®), results for which are given by way of comparison, falls during the same period.

I claim:

1. An anticorrosion coating composition for a metal substrate which comprises:
   (a) from approximately 10 to approximately 40% by weight of a particulate metal,
   (b) from approximately 1 to approximately 12% by weight of boric acid and hexavalent chromiun,
   (c) from approximately 0.5 to approximately 4% by weight of a pH regulator,
   (d) from approximately 7 to approximately 30% by weight of a high-boiling solvent of the group consisting of polyols and glycol ethers,
   (e) from at least approximately 0.1 to approximately 10% by weight of an organic cosolvent with a solubility parameter of 10.8±1,
   (f) from approximately 0.1 to approximately 10% by weight of mineral spirits
   (g) from approximately 1 to approximately 3% by weight of a system of nonionic surfactants comprising at least one water-soluble surfactant which has a HLB close to but higher than 10 and a surfactant which is soluble in mineral spirits which has a HLB close to but lower than 10,
   (h) water.

2. The composition as claimed in claim 1, wherein the particulate metal is chosen from of the group consisting of zinc, aluminum, cadmium and mixtures and alloys thereof which have a negative normal electrode potential whose absolute value is greater than that of iron.

3. The composition as claimed in claim 1, which comprises from approximately 0.5 to approximately 6% by weight of mineral spirits.

4. The composition as claimed in claim 1, which comprises a quantity of organic cosolvent with a specified solubility parameter, which is at least practically equal to the quantity of mineral spirits, on a weight basis.

5. The composition as claimed in claim 4, wherein the organic cosolvent has a solubility parameter lying between the solubility parameters of said mineral spirits and of the high-boiling solvent.

6. The composition as claimed in claim 4, wherein the organic cosolvent is chosen from the group consisting of ethylglycol acetate and propylene glycol methyl ether acetate.

7. The composition as claimed in claim 1, which additionally comprises a thickening agent.

8. The composition as claimed in claim 1, which additionally comprises up to approximately 10% of solid lubricant.

9. The composition as claimed in claim 8 wherein the solid lubricant is selected from the group consisting of PTFE and $MoS_2$.

10. The composition as claimed in claim 1, wherein the particulate metal is introduced into the composition in the form of a paste comprising the said metal in the form of particles and mineral spirit.

11. The composition as claimed in claim 10, wherein the paste comprises from approximately 85 to approximately 92% by weight of particulate metal and from approximately 8 to approximately 15% by weight of mineral spirit.

12. The composition as claimed in claim 1, when made by a process wherein the metal is introduced into the composition in the form of dry particles.

13. The composition as claimed in claim 1 in which said pH regulator is selected from the group consisting of zinc oxide and cobalt carbonate.

14. The composition as claimed in claim 4 in which said cosolvent has a solubility parameter between about 9 and about 12.

15. The composition of claim 1 in which said cosolvent is selected from the group consisting of ethylglycol acetate and propylene glycol methyl ether acetate.

16. The composition of claim 1 in which said thickening agent comprises hydroxyethyl cellulose.

17. The composition according to claim 1 wherein the hexavalent chromiun is introduced by the addition of chromic acid.

* * * * *

UNITED STATES PATENT AND TRADEMARK OFFICE
CERTIFICATE OF CORRECTION

PATENT NO. : 4,931,074

DATED : June 5, 1990

INVENTOR(S) : Gilbert Marguier

It is certified that error appears in the above-identified patent and that said Letters Patent is hereby corrected as shown below:

Col. 6, line 22, after "quantity of", insert --said--.

Col. 6, line 27, delete "said".

Col. 6, line 49, change "spirit" to --spirits--.

Col. 6, line 62, change "claim 1" to --claim 7--.

Signed and Sealed this

Twentieth Day of July, 1993

Attest:

MICHAEL K. KIRK

*Attesting Officer*  *Acting Commissioner of Patents and Trademarks*